US006597008B1

(12) United States Patent
Umemoto et al.

(10) Patent No.: US 6,597,008 B1
(45) Date of Patent: Jul. 22, 2003

(54) METHOD OF READING A RADIATION IMAGE CONVERTING PANEL

(75) Inventors: Chiyuki Umemoto, Kaisei-machi (JP); Yuji Isoda, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/657,921

(22) Filed: Sep. 8, 2000

(30) Foreign Application Priority Data

Sep. 9, 1999 (JP) .......................................... 11-255757

(51) Int. Cl.[7] ............................................... G01B 42/00
(52) U.S. Cl. ........................ 250/584; 250/585; 250/586
(58) Field of Search ................................ 250/584, 585, 250/586

(56) References Cited

U.S. PATENT DOCUMENTS

| | | | | |
|---|---|---|---|---|
| 4,346,295 A | | 8/1982 | Tanaka et al. | 250/586 |
| 4,485,302 A | | 11/1984 | Tanaka et al. | 250/585 |
| 4,752,557 A | | 6/1988 | Tsuchino et al. | 430/496 |
| 4,816,679 A | | 3/1989 | Sunagawa et al. | 250/585 |
| 4,922,103 A | | 5/1990 | Kawajiri et al. | 250/586 |
| 4,944,026 A | | 7/1990 | Arakawa et al. | 250/484.4 |
| 5,227,253 A | | 7/1993 | Takasu et al. | 428/690 |
| 5,693,254 A | * | 12/1997 | Sieber et al. | 250/370.09 |
| 6,252,243 B1 | * | 6/2001 | Isoda et al. | 250/581 |
| 6,255,660 B1 | * | 7/2001 | Isoda et al. | 250/585 |
| 6,326,636 B1 | * | 12/2001 | Isoda et al. | 250/584 |

FOREIGN PATENT DOCUMENTS

| | | |
|---|---|---|
| JP | 6236599 | 2/1987 |
| JP | 1101540 | 4/1989 |
| JP | 2129600 | 5/1990 |
| JP | 2193100 | 7/1990 |
| JP | 2280100 | 11/1990 |
| JP | 727078 | 1/1995 |
| JP | 2000-155200 | 6/2000 |

* cited by examiner

*Primary Examiner*—Constantine Hannaher
*Assistant Examiner*—Shun Lee
(74) *Attorney, Agent, or Firm*—Birch, Stewart, Kolasch & Birch, LLP

(57) ABSTRACT

A method of reading a radiation image converting panel whereby pillar-shaped stimulatable fluorescent substances formed on a supporting member by deposition are excited by irradiating excitation light to a surface of the radiation image converting panel on which radiation energy has been stored and recorded by irradiation of the radiation; emitting the radiation energy as photostimulated fluorescent light; and reading out the photostimulated fluorescent light photoelectrically from both surfaces of the radiation image converting panel.

3 Claims, 6 Drawing Sheets

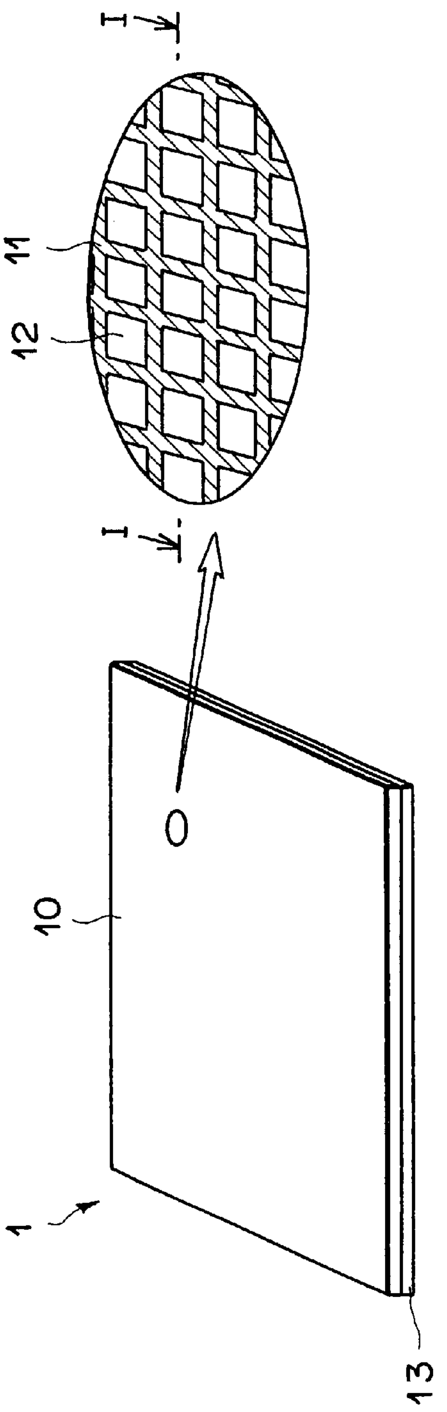
FIG.1B
FIG.1A
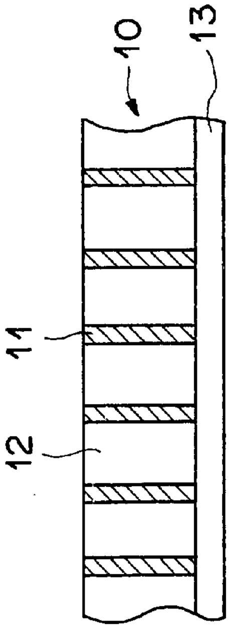
FIG.1C

METHOD OF READING A RADIATION IMAGE CONVERTING PANEL

BACKGROUND OF THE INVENTION

1. Field of the Invention

The present invention relates generally to a method of reading a radiation image converting panel, and more particularly to a radiation image-converting panel reading method of a double focusing type that takes advantage of the photostimulated luminescence of a stimulatable fluorescent substance (BaFBr, $Eu^{2+}$).

2. Description of the Related Art

A radiation image recording-reproducing method (radiation image converting method) employing a stimulatable fluorescent substance is known as a replacement method for radiography that employs a combination of radiographic film and a sensitizing screen. This method makes use of a radiation image converting panel that contains a stimulatable fluorescent substance (also stated as a stimulatable fluorescent substance sheet). In the method, radiation transmitted through or emitted from a subject is absorbed in the stimulatable fluorescent substance contained in the sheet. Then, an electromagnetic wave (excitation light), such as visible light, infrared radiation, etc., is irradiated to the stimulatable fluorescent substance to excite it. With the excitation, the radiation energy that has been stored in the stimulatable fluorescent substance is emitted as fluorescent light. This phenomenon is called photostimulated luminescence. The fluorescent light is photoelectrically read and converted to an electrical signal. Based on the electrical signal, the radiation image of the subject is reproduced as a visible image. After the radiation energy remaining in the stimulatable fluorescent substance has been erased, the radiation image converting panel that has finished the reading is repeatedly used by the same radiation recording-reproducing method.

The radiation image converting panel employed in the above-mentioned radiation image recording-reproducing method is normally provided on its lower surface with a supporting member and on its upper surface with a protective film. The stimulatable fluorescent layer of the radiation image converting panel is usually made up of stimulatable fluorescent particles and a bonding agent containing and supporting the fluorescent particles in a dispersed state. However, a stimulatable fluorescent layer consisting of an aggregate of a stimulatable fluorescent substance without a bonding agent formed by a deposition or sintering method, or a stimulatable fluorescent layer containing a high polymer in a gap in the above-mentioned aggregate, is also known. Radiation image converting panels employing these stimulatable fluorescent layers can all be used in the aforementioned radiation image recording-reproducing method.

Reading of radiation image information by the radiation recording-reproducing method is generally performed by irradiating excitation light to the upper surface of the radiation image converting panel, then reading out the fluorescent light emitted from the stimulatable fluorescent substance by a focusing guide provided on the side where the excitation light is irradiated, and converting the read fluorescent light to an electrical image signal (single focusing type). However, in the case where the fluorescent light emitted from the stimulatable fluorescent substance is read out as much as possible, or in the case where, for a latent image formed by radiation energy stored within the radiation image converting panel, an energy intensity change (intensity distribution) in the direction of depth of the sheet is obtained as radiation image information, a double focusing type that focuses the fluorescent light emitted from the upper and lower surfaces of the radiation image converting panel is utilized. A radiation image recording-reproducing method of this double focusing type is described, for example, in Japanese Unexamined Patent Publication No. 55(1980)-87970.

In the radiation image recording-reproducing method of the above-mentioned single focusing type or double focusing type, it is desirable that the radiation image converting panel have high sensitivity and be capable of reproducing a high-quality radiation image. Particularly, in the formation of a medical radiation image that employs X-rays, which is a representative use of the radiation image recording-reproducing method, it is desirable to obtain a radiation image having high quality (particularly, high sharpness related with high resolution), with a small exposure-dose of X-rays.

The diffusion of excitation light within the radiation image converting panel has a significant influence on the sharpness of a radiation image formed by the radiation image recording-reproducing method. This is for the following reason. The latent image of the radiation energy recorded on the radiation image converting panel is read out by moving a beam of excitation light to irradiate it to the panel surface in a time-series manner and then sequentially focusing the fluorescent light emitted from the panel surface by the irradiation of the excitation light. However, if the irradiated excitation light diffuses within the panel (particularly, in the plane direction), the excitation light will go beyond the irradiated region and excite the fluorescent particles outside the irradiated region that have radiation energy, and consequently, the radiation energy outside the irradiated region, as well as the radiation energy inside the irradiated region, will be read out as fluorescent light.

It is known that, in the radiation image converting panel employed in the radiation image recording-reproducing method of the single focusing type, excitation-light reflecting partitions for dividing the panel finely along the panel surface are provided in the stimulatable fluorescent layer of the panel to avoid diffusion of excitation light. For example, Japanese Unexamined Patent Publication No. 59(1984)-202100 discloses that a honeycomb structure consisting of cells divided by partitions is provided in a radiation image converting panel wherein a stimulatable fluorescent layer is provided on a supporting member and that each cell is filled with a stimulatable fluorescent substance. Japanese Unexamined Patent Publication No. 62(1987)-36599 discloses a radiation image converting panel wherein a large number of recesses (in which the ratio between the diameter and the depth is 1:3.5 or greater) are regularly provided on one surface of a supporting member and filled with a stimulatable fluorescent substance. Japanese Unexamined Patent Publication No. 2(1990)-129600 discloses a radiation image converting panel wherein a great number of holes formed in the direction of depth of a supporting plate are filled with a stimulatable fluorescent substance. Japanese Unexamined Patent Publication No. 2(1990)-280100 discloses a radiation image converting panel wherein a micro structure in the form of a honeycomb, formed on a supporting member, is filled with a fluorescent substance. PCT Japanese Publication No. 5(1993)-512636 discloses a method of fabricating phosphorescent pixels by the use of a metal mold.

The above-mentioned stimulatable fluorescent layer, in which a large number of recesses formed in the base or supporting member are filled with fluorescent particles, is effective in forming a radiation image with high quality (particularly high sharpness), because diffusion of excitation light is prevented by the supporting material which becomes partitions within the radiation image converting sheet. However, since the partitions occupy part of the stimulatable fluorescent layer, the problem of the fill amount of the fluorescent particles per unit volume being necessarily reduced will arise. A reduction in the amount of the fluorescent substance within the stimulatable fluorescent layer per unit volume reduces an absorption amount of X-rays and therefore gives rise to a reduction in the sensitivity of the radiation image converting panel. The sensitivity of the radiation image converting panel can be increased by increasing the thickness of the layer. An increase in the layer thickness, however, results in a reduction in the sharpness of an image.

As a means for solving such a problem, in Japanese Unexamined Patent Publication No. 7(1995)-27078 there is disclosed a radiation image information reader employing a radiation image converting panel wherein a stimulatable fluorescent substance is deposited by a deposition method and has a pillar-shaped crystal structure. Since the fluorescent layer formed by deposition contains no bonding agent, it becomes possible to make the density of the fluorescence substance higher, compared with a dispersion system containing a bonding agent. This enhances the radiation absorption factor and the sensitivity with respect to radiation, resulting in an enhancement in the graininess of an image.

On the other hand, in the radiation image information reader that is employed in a radiation image recording-reproducing system, from the viewpoint of shortening the time required to read fluorescent light, device compactness, and cost reduction, a line light source, which irradiates excitation light in line form to the sheet, such as a fluorescent lamp, a cold cathode fluorescent lamp, a light-emitting diode (LED) array, a broad area laser, etc., is used as an excitation light source, and a line sensor, wherein a large number of photoelectric converting elements are arrayed along the direction of length of the line excitation light irradiated to the sheet by the line light source, is used as photoelectric reading means. The radiation image information reader is also provided with scan means movable with respect to the above-mentioned line light source and line sensor in a direction substantially perpendicular to the length direction of the line excitation light (Japanese Unexamined Patent Publication Nos. 60(1985)-111568, 60(1985)-236354, and 1(1989)-101540, etc.).

It is desired that in the radiation image-converting panel reading method of the double focusing type, as with the radiation image-converting panel reading method of the single focusing type, high sensitivity and a high-sharpness radiation image be obtained. Therefore, there is an increasingly strong demand for the development of a radiation image converting panel which is capable of reproducing a radiation image with even higher sensitivity and high sharpness.

In addition, the quantum noise of radiation is contained in the step of storing and recording a radiation image on the stimulatable fluorescent sheet and is superposed on an image signal read out by the radiation image converting panel, so a reading method capable of effectively removing the quantum noise is also required in order to enhance the signal-to-noise (S/N) ratio of a radiation image reproduced by the read image signal.

SUMMARY OF THE INVENTION

The present invention has been made in view of the aforementioned problems found in the prior art. Accordingly, it is an object of the present invention to provide a radiation image converting panel which enhances the graininess of an image by increasing the filling density of a fluorescent substance, while reducing scattering of excitation light by a radiation image converting-panel reading method of the double focusing type. Another object of the present invention is to provide a radiation image-converting panel reading method which is capable of collecting a larger amount of image information and enhancing the sharpness of an image, by employing the aforementioned radiation image converting panel.

To achieve the aforementioned objects of the present invention, there is provided a method of reading a radiation image converting panel which comprises at least an optically transparent supporting member and a fluorescent layer having pillar-shaped stimulatable fluorescent substances formed on the supporting member by a deposition method, the reading method comprising the steps of:

- exciting the stimulatable fluorescent substances by irradiating excitation light to a surface of the radiation image converting panel on which energy of radiation has been stored and recorded by irradiation of the radiation;
- emitting the radiation energy as photostimulated fluorescent light; and
- reading out the photostimulated fluorescent light photoelectrically from both surfaces of the radiation image converting panel.

The aforementioned deposition method not only means a vapor deposition method wherein a stimulatable fluorescent substance is evaporated by heating and deposited on a predetermined base, but broadly means a method of depositing a stimulatable fluorescent substance. For example, it includes sputter deposition, chemical vapor deposition (CVD), ion plating, etc.

The expression "fluorescent layer having pillar-shaped stimulatable fluorescent substances" refers to a layer that has pillar-shaped stimulatable fluorescent substances in a direction approximately perpendicular to the surface of the fluorescent layer, the pillar-shaped stimulatable fluorescent substances being optically independent of one another. The words "optically independent" mean that the diffusion of irradiated excitation light within the fluorescent layer (particularly diffusion in the plane direction) is suppressed and that the irradiated excitation light hardly goes beyond a region irradiated and excites fluorescent particles having radiation energy outside the irradiated region. That is, the words "optically independent" mean that radiation energy outside the irradiated region is difficult to read out as photostimulated fluorescent light, along with radiation energy inside the irradiated region. The pillar-shaped fluorescent substances can be formed, for example, by partitions that divide the fluorescent layer along the plane direction. However, it is desirable that the partitions have a stimulatable fluorescent substance.

Since the radiation image converting panel is a panel comprising at least the supporting member and the fluorescent layer, the radiation image converting panel may be provided with other layers such as a protective layer, a bonding layer, etc. It is preferable that a multi-layer film filter for transmitting only photostimulated fluorescent light be provided on the opposite side from the side of the radiation image converting panel to which the excitation light is irradiated.

It is desirable that the irradiation of the excitation light be performed by a line light source which emits the excitation light in line form. It is also desirable that the reading from both surfaces of the radiation image converting panel be performed by a line sensor having a large number of photoelectric converting elements arrayed in line form, or an area sensor in which a great number of line-shaped photoelectric converting elements are arrayed in rows.

In the radiation image-converting panel reading method of the present invention, the stimulatable fluorescent layer of the radiation image converting panel is constructed of the optically independent pillar-shaped fluorescent substances, formed by a deposition method. Therefore, the directivities of the photosimulated excitation light and photosimulated fluorescent light are enhanced and the permeabilities for the photosimulated excitation light and photosimulated fluorescent light become higher. As a result, the stimulatable fluorescent layer can be made thicker than that formed by the aforementioned conventional coating methods and can have even higher sensitivity with respect to radiation.

Since the stimulatable fluorescent layer formed by the deposition method contains no bonding agent, the density of the fluorescent substance can be made about two times higher, compared with a dispersion system containing a bonding agent. Also, as the radiation absorption factor of the stimulatable fluorescent layer per unit volume can be enhanced, the stimulatable fluorescent layer has high sensitivity with respect to radiation and is capable of enhancing the graininess of an image. Furthermore, because the stimulatable fluorescent layer is constructed with the optically independent pillar-shaped stimulatable fluorescent substances, the stimulatable fluorescent layer is capable of enhancing the sharpness of an image by reducing scattering of excitation light.

If the partitions for dividing the optically independent pillar-shaped fluorescent substances, formed by the deposition method, contain a stimulatable fluorescent substance, the partitions can suppress a reduction in the sensitivity of the radiation image converting panel due to a reduction in an absorption amount of X-rays, without giving rise to the problem of the fill amount of the fluorescent particles of the fluorescent layer per unit volume being reduced.

In addition, the radiation image-converting panel reading method of the present invention can capture a larger amount of photostimulated fluorescent light in the direction of thickness of the fluorescent layer, because it photoelectrically reads out photostimulated florescent light from both surfaces of the radiation image converting panel. Therefore, the reading method is capable of enhancing quality (sharpness) and also enhancing the S/N ratio of the radiation image reproduced by an image signal obtained. In the case where a multi-layer film filter for transmitting only photostimulated fluorescent light is provided on the opposite side from the side of the radiation image converting panel to which the excitation light is irradiated, the multi-layer film filter selectively transmits only the photostimulated fluorescent light emitted from the radiation image converting panel. Therefore, the reading method is capable of further enhancing the S/N ratio of the radiation image reproduced by an image signal obtained.

Furthermore, by performing the irradiation of excitation light by a line light source for irradiating excitation light in line form, and by performing reading from both surfaces of the radiation image converting panel using a line sensor having a large number of photoelectric converting elements arrayed in line form, the time for reading photostimulated fluorescent light can be shortened, and furthermore, the converting panel can be made compact and the number of scanning components reduced.

BRIEF DESCRIPTION OF THE DRAWINGS

The present invention will be described in further detail with reference to the accompanying drawings wherein:

FIG. 1A is a perspective view showing a first construction example of a stimulatable fluorescent panel constructed according to the present invention;

FIG. 1B is an enlarged perspective view showing the fluorescent layer of the stimulatable fluorescent panel in FIG. 1A;

FIG. 1C is a sectional view of the stimulatable fluorescent panel in FIG. 1A;

DESCRIPTION OF THE PREFERRED EMBODIMENTS

Figure 2:
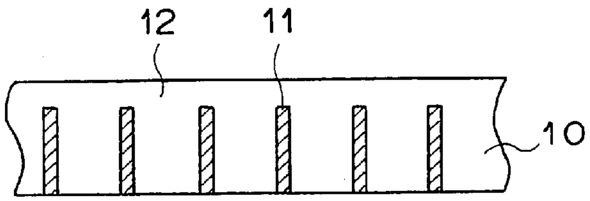
FIG. 2 is a sectional view showing a second construction example of the stimulatable fluorescent panel shown in FIG. 1.

A radiation image converting panel, employed in the panel reading method of the present invention, comprises at least an optically transparent supporting member, and a fluorescent layer having pillar-shaped stimulatable fluorescent substances formed on the supporting member by a deposition method. Formation of the fluorescent layer having pillar-shaped stimulatable fluorescent substances can employ both a support member having a smooth surface whose surface is homogeneous, and a support member having a base-surface pattern suitable to form the pillar-shaped stimulatable fluorescent substances by adhesion or deposition.

In the case of employing a supporting member with a homogeneous and smooth surface, there is a mesh mask method wherein either a metal mesh netted with sufficiently fine metal wires (e.g., copper wires), or a fine mesh with fine holes opened with laser light is attached to a supporting member and a stimulatable fluorescent substance is deposited on the supporting member by vapor deposition, sputtering, etc.; or a metal mold method wherein a mold with a fine pillar-shaped block pattern and a recess pattern is coated with a silicon mold-separating agent and filled with a stimulatable fluorescent substance, a supporting member is bonded to this filled surface, and the mold is removed to expose pillar-shaped fluorescent substances. Furthermore, a crack method can be employed in which a stimulatable fluorescent substance is uniformly deposited and then cracks are caused by a heating process, etc.

For a supporting member with a base-surface pattern, a method of growing pillar-shaped blocks by vapor deposition can be employed. For example, a supporting member with a base-surface pattern is obtainable, by a method of printing ink by photogravure printing or silk printing and then performing a suitable patterning operation to generate a base-surface pattern corresponding to a fine pillar-shaped pattern; or a method of generating a base-surface pattern physically and/or chemically suitable for vapor deposition of a stimulatable fluorescent substance by photoengraving; or a method of generating a base-surface pattern by performing a sealing process on an aluminum plate anodized. In the case of employing a support member which has a base-surface pattern, a thin pattern layer with a stimulatable fluorescent substance may be formed on the supporting member and deposited on a base-surface pattern. In this manner, island-shaped fine blocks physically and/or chemically suitable for vapor deposition of a stimulatable fluorescent substance are obtained as a base-surface pattern in a form enclosed by fine lines, grooves, recesses, or cracks in which vapor deposition is difficult to promote.

The pillar-shaped fluorescent substances, in addition to the above-mentioned methods, may also be formed by stimulatable fluorescent substance containing partitions which finely divide the fluorescent layer in the plane direction. If the stimulatable fluorescent substance containing partitions are employed, diffusion of excitation light in the plane direction can be suppressed without reducing the fill amount of the fluorescent particles of the fluorescent layer per unit volume, i.e., reducing sensitivity, even if the partitions occupy part of the fluorescent layer. As a result, a radiation image with high sharpness can be formed. In addition, it is preferable that the fluorescent layer consist of stimulatable fluorescent substance containing partitions which finely divide the fluorescent layer along the plane direction, and pillar-shaped fluorescent substances which are divided by the stimulatable florescent partitions and exhibit a reflection characteristic differing from that of the stimulatable fluorescent substance containing partitions.

The optically transparent supporting member is normally formed from a transparent plastic film or sheet. The plastic material can be arbitrarily selected from known materials such as polyethylene terephtalate, polyethylene naphtalate, polyamide, polyimide, alamide resin, etc. The supporting member is not limited to these materials. However, it is desirable that it t employ plastic film having sufficient strength and high transparency. This plastic film normally ranges in thickness from 10 to 1000 μm.

The stimulatable fluorescent layer, which is made up of the stimulatable fluorescent substance containing partitions dividing the stimulatable fluorescent layer along the plane direction and the pillar-shaped fluorescent substances, will hereinafter be described with reference to the drawings.

FIG. 1 illustrates a radiation image converting panel 1 of the present invention, which comprises a supporting member 13 and a stimulatable fluorescent layer 10. The stimulatable fluorescent layer 10 normally ranges from 20 μm into 1 mm thickness. However, it is preferable that the thickness range between 50 μm and 500 μm in consideration of a balance between sensitivity and sharpness. It is desirable that the stimulatable fluorescent substance containing partition 11 range from 5 μm to 50 μm in width. Furthermore, it is desirable that the pillar-shaped stimulatable fluorescent substance 12 range from 20 μm to 200 μm in width (average value of widths in the plane direction).

Figure 3:
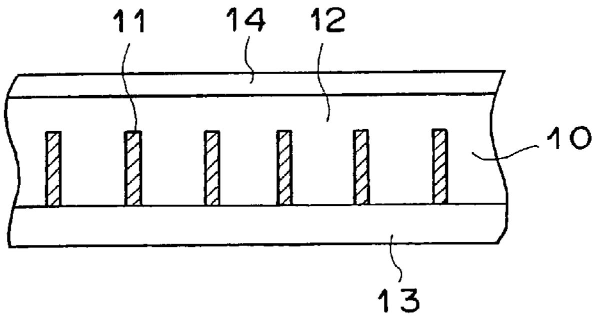
FIG. 3 is a sectional view showing a third construction example of the stimulatable fluorescent panel shown in FIG. 1.
Figure 4:
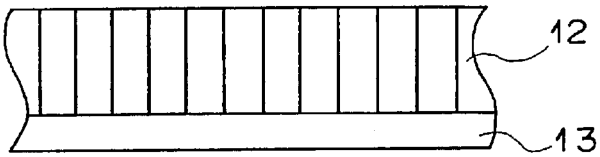
FIG. 4 is a sectional view showing a fourth construction example of the stimulatable fluorescent panel shown in FIG. 1.
Figure 5:
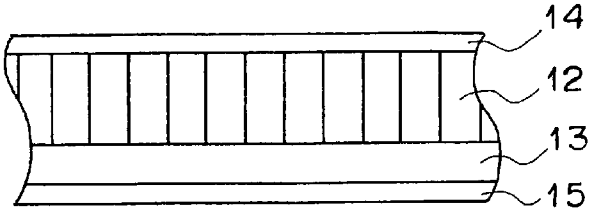
FIG. 5 is a sectional view showing a fifth construction example of the stimulatable fluorescent panel shown in FIG. 1.

In the stimulatable fluorescent layer 10 of FIG. 1, the top and bottom portions of the stimulatable fluorescent substance containing partition 11 both reach the upper and lower surfaces of the fluorescent layer 10. However, either or both of the top and bottom portions may be buried in the stimulatable fluorescent layer 10. For example, as shown in FIG. 2, the top portion of the stimulatable fluorescent substance containing partition 11 is buried in the stimulatable fluorescent layer 10 without reaching the upper surface of the fluorescent layer 10. Thus, the stimulatable fluorescent layer 10 does not always need to be divided completely by the stimulatable fluorescent substance containing partitions 11. However, it is desirable that the height of the partition 11 range from 1/3 to 1/1 of the thickness of the stimulatable fluorescent layer 10. FIG. 3 illustrates the stimulatable fluorescent layer 10 provided on its lower surface with the supporting member 13 and on its upper surface with a protective film 14. The protective film 14 may have a function of enhancing the score resistance and moisture resistance of the radiation image converting panel 1. In addition, the pillar-shaped stimulatable fluorescent substances 12 do not always need to be divided by the partitions 11. For example, as shown in FIG. 4, the pillar-shaped stimulatable fluorescent substances 12 may be formed by providing pillar portions, in which the crystal of a stimulatable fluorescent substance grows, on the supporting member 13. Furthermore, as shown in FIG. 5, a multi-layer film filter 15 for transmitting only photostimulated fluorescent light may be provided on the opposite side from the side of the radiation image converting panel 1 to which excitation light is irradiated.

It is preferable that the stimulatable fluorescent substances, which are employed in the pillar-shaped stimulatable fluorescent substances 12 and stimulatable fluorescent substance containing partitions 11 of the stimulatable fluorescent layer 10, exhibit photostimulated luminescence ranging from 300 to 500 nm in wavelength, by irradiation of excitation light of 400 to 900 nm in wavelength. Examples of such a stimulatable fluorescent substance are described in detail in Japanese Unexamined Patent Publication Nos. 2(1990)-193100 and 4(1992)-310900. Particularly, an alkaline-earth metal halogen fluorescent substance, activated by europium (Eu) or cerium (Ce), and a cerium-activated rare earth oxyhalogen fluorescent substance, are preferred. The stimulatable fluorescent substances that are employed in the pillar-shaped stimulatable fluorescent substance 12 and the stimulatable fluorescent substance containing partition 11 may be the same or different. Normally, the same stimulatable fluorescent substance is employed. Instead, on one side, a stimulatable fluorescent substance, which is different in composition from the stimulatable fluorescent substance on the other side but is in the same wavelength region in excitation wavelength and photostimulated luminescence wavelength, can be employed.

The pillar-shaped stimulatable fluorescent substances 12 and the stimulatable fluorescent substance containing partitions 11, which constitute the stimulatable fluorescent layer 10, exhibit different reflection characteristics with respect to excitation light. More specifically, there are two cases: (1) the pillar-shaped stimulatable fluorescent substance 12 is lower in reflection coefficient with respect to excitation light than the stimulatable fluorescent substance containing partition 11, and (2) the pillar-shaped stimulatable fluorescent substance 12 is higher in reflection coefficient with respect to excitation light than the stimulatable fluorescent substance containing partition 11. In the case of obtaining a radiation image with higher sharpness, the stimulatable fluorescent layer 10 in the case (1) is more advantageous than the stimulatable fluorescent layer 10 in the case (2)

In order for the stimulatable fluorescent substance containing partition 11 or pillar-shaped stimulatable fluorescent substance 12 to exhibit a high reflection coefficient with respect to excitation light, a method of making fluorescent particles smaller in diameter (fining), or a method of filling with excitation-light reflecting particles, such as white pigments (e.g., titanium dioxide, barium sulfide, etc.), fluorescent particles exhibiting no photostimulated luminescence, etc., can be utilized. These methods can be employed singly or in combination. Instead, a thin film, which reflects excitation light, can be provided between the pillar-shaped stimulatable fluorescent substance 12 and the stimulatable fluorescent substance containing partition 11.

Conversely, in order for the stimulatable fluorescent substance containing partition 11 or pillar-shaped stimulatable fluorescent substance 12 to exhibit a low reflection coefficient with respect to excitation light, a method of making fluorescent particles greater in diameter, or a method of filling with dyes which absorb excitation light, can be utilized. These methods can be employed singly or in combination. Alternatively, a thin film, which absorbs excitation light, can be provided between the pillar-shaped stimulatable fluorescent substance 12 and the stimulatable fluorescent substance containing partition 11.

Now, formation of the stimulatable fluorescent layer 10 by a deposition method will be described. It is preferable that the formation of the stimulatable fluorescent layer 10 of the present invention be performed by a conventional vacuum deposition method wherein either a fluorescent substance is deposited on a supporting member within a vacuum bath of $10^{-3}$ Pa or greater while supplying the fluorescent substance to an evaporation dish by an amount of instantaneous evaporation at a time, or a fluorescent substance is deposited on a supporting member by dividing the components into evaporation dishes according to the boiling points and then corresponding to the composition rate. It may also be formed by a conventional sputtering method wherein a fluorescent substance is deposited on a supporting member by applying a plasma to a target (fluorescent substance) in an ambient atmosphere of $10^{-3}$ Pa or less. In either method, the sharpness of an image is excellent compared with a dispersion type fluorescent layer containing a bonding agent, because the crystal structure of the fluorescent layer 10 has grown in the direction of thickness. In addition, because the fluorescent layer 10 contains no bonding agent, the sensitivity is excellent compared with a fluorescent layer of the same thickness. If the sensitivities are made the same, image sharpness can be further enhanced.

It is desirable to provide a light reflecting layer consisting of a material which reflects excitation light, on the opposite side from the side of the stimulatable fluorescent layer 10 of the present invention to which excitation light is irradiated. Provision of such a light reflecting layer can further enhance the sensitivity of the stimulatable fluorescent layer 10. The light reflecting layer can employ a layer wherein white pigments, such as titanium dioxide, barium sulfide, etc., or fluorescent particles exhibiting no photostimulated luminescence, are dispersedly supported by a bonding agent. Note that although it is preferable that the stimulatable fluorescent layer 10 of the present invention be provided on the supporting member 13, the light reflecting layer is normally provided between the supporting member 13 and the stimulatable fluorescent layer 10. Instead of the light reflecting layer, an excitation light absorbing layer can also be provided between the supporting member 13 and the stimulatable fluorescent layer 10. This case is particularly advantageous in forming a radiation image having high sharpness.

It is preferable that a multi-layer film filter for transmitting only photostimulated fluorescent light be provided on the opposite side from the side of the radiation image converting panel to which excitation light is irradiated. Since the multi-layer film filter selectively transmits only the photostimulated fluorescent light emitted from the radiation image converting panel 1, it becomes possible to enhance the S/N ratio of the radiation image reproduced by an image signal obtained. The multi-layer film filter is formed, for example, by sequentially stacking two or more kinds of substances differing in refraction factor, in a thickness of about one-fourth of the wavelength of light. The substances that are stacked can employ a variety of substances that are used in known optical films. The multi-layer film filter can be provided by stacking a thin film on the surface of the supporting member ranging from a few layers to tens of layers by vacuum deposition, sputtering, ion plating, etc., as described in Japanese Unexamined Patent Application No. 62(1987)-169097.

It is preferred to provide the protective film 14 on the opposite side of the stimulatable fluorescent layer 10 from the supporting member 13. It is desirable that this protective film 14 be transparent so that it has little influence on incidence of excitation light and emission of photostimulated fluorescent light. It is also desirable that the protective film 14 is chemically stable and has high physical intensity so that the stimulatable fluorescent layer 10 can be sufficiently protected from external physical shocks and a change in chemical quality.

The protective film 14 can be attached to the surface of the stimulatable fluorescent layer 10, by a method of attaching a separately formed plastic film to the stimulatable fluorescent layer 10 by the use of an adhesive, or a method of coating a protective material solution on the surface of the stimulatable fluorescent layer 10 and then drying the solution. In order to reduce interference unevenness and further enhance the quality of a radiation image, the protective film 14 can be filled with fine-grained fillers. The preferred resin material for fabricating a light transmitting plastic film is polyester resin, such as polyethylene terephtalate, polyethylene naphtalate, etc., and a cellulose ester derivative, such as cellulose triacetate, etc. However, various resin materials, such polyolefine, polyamide, etc., can be employed. The thickness of the protective film is normally 30 $\mu$m or less. It is preferable that it be 1 to 15 $\mu$m and further preferable that it be 2 to 10 $\mu$m.

It is preferred to provide a fluororesin-coated layer on the surface of the protective film 14 in order to enhance the contamination resistance of the protective film 14. This fluororesin-coated layer can be formed by dissolving (or dispersing) fluororesin into an organic solvent, then coating the prepared fluororesin solution on the protective film surface, and drying. Fluororesin may be used singly. However, it is normally used as a mixture with resin having high film formability with respect to fluororesin. It can also be employed in combination with either an oligomer having a polysiloxane skeleton or an oligomer having a perfluoroalkyl group. The coating of the fluororesin solution can be performed by making use of a general coating means such as a doctor blade, a roll coater, a knife coater, etc. This fluororesin-coated layer can be filled with fine-grained fillers to reduce interference unevenness and to further enhance the quality of a radiation image. The thickness of the fluororesin-coated layer is normally 0.5 to 20 $\mu$m, preferably 1 to 5 $\mu$m. When forming the fluororesin-coated layer, a filling material, such as a bridging agent, a film hardening agent, a yellowing preventive, etc., can be employed. Particularly, the filling of a bridging agent is advantageous with respect to enhancement in the durability of the fluororesin-coated layer.

Reading from the upper and lower surfaces of the radiation image converting panel is performed by making use of both a line light source which irradiates excitation light in line form and a line sensor in which a large number of photoelectric converting elements are arrayed in line form.

The line light source includes not only a fluorescent lamp, a cold cathode fluorescent lamp, a light-emitting diode (LED) array, a laser diode (LD) array, etc., wherein a light source itself is in the form of a line, but also a broad area laser (not limited to a broad area semiconductor laser), an electroluminescence (EL) device, etc., as long as they irradiate one-dimensional excitation light to the radiation image converting panel surface. Note that it is preferable to employ the LED array, the LD array, or the broad area laser and it is desirable to adopt excitation light guide means, which consists of a cylindrical lens, a slit, a CELFOC (trademark) or rod lens array, a fluorescent light guide sheet, an optical fiber bundle, a hot mirror, a cold mirror, etc., or a combination of these, for suppressing the spread of line excitation light in a direction (minor axis direction) perpendicular to the length direction (major axis direction) of the line excitation light so that the line excitation light is formed on the panel surface. It is desirable that the fluorescent light guide sheet be formed from a glass or high polymer sheet wherein an activator for the fluorescent substance is at the luminescent center ($Eu^{3+}$) when the optimum secondary excitation wavelength of the stimulatable fluorescent layer is 600 nm or so.

The excitation light to be emitted from the abovementioned light source may be light that is successively emitted, or pulsed light that is emitted in a pulse form wherein emission and non-emission are repeated. However, from the viewpoint of noise reduction it is desirable that it be high-output pulsed light.

Preferably, the length of the irradiated region in the major axis direction on the radiation image converting panel 1, formed by the line excitation light emitted from the line light source, is longer than or equal to one side of an effective image region on the radiation image converting panel. In the case where it is longer than this one side, excitation light may be irradiated obliquely with respect to the sheet edge.

The line sensor can employ an amorphous silicon sensor, a charge coupled device (CCD) imager, a back illuminated type CCD imager, a metal-oxide-semiconductor (MOS) imager, etc. It is desirable that the length be longer than or equal to one side of the effective image region on the sheet.

The size of each light receiving surface of the photoelectric converting elements constituting the line sensor ranges from 10 to 4000 $\mu$m, preferably 100 to 500 $\mu$m. It is desirable that the number of photoelectric converting elements in the direction of length of the line sensor be 1000 or more. The arrangement of the photoelectric converting elements is not limited to a large number of photoelectric converting elements arrayed in line form in the above-mentioned major axis direction. For instance, they may be arrayed in zigzag fashion as long as they extend in the major axis direction as a whole.

Between the radiation image converting panel and the line sensor, photostimulated fluorescent light guide means may be further provided which consists of a refractive index profile type lens array (such as a CELFOC (registered trademark) or rod lens array which is constructed with an imaging system wherein an object plane and an image plane correspond to 1:1), a cylindrical lens, a slit, an optical fiber bundle, a hot mirror, a cold mirror, etc., or a combination of these.

Moreover, between the radiation image converting panel and the line sensor, it is preferable to provide an excitation light cut filter (e.g., a sharp cut filter, a band-pass filter, etc.) that transmits photostimulated fluorescent light but does not transmit excitation light, in order to prevent the excitation light being incident on the line sensor.

For movement of the line light source and the line sensor and movement of the radiation image converting panel, the line light source and the line sensor may be moved with respect to the panel, or vise versa. Furthermore, they may both be moved. Note that if the line light source and the line sensor are moved, they are moved as one body.

For a radiation image recording-reproducing method of the double focusing type of the present invention which employs the above-mentioned radiation image converting panel, a description thereof will hereinafter be given with reference to the drawings.

Figure 6:
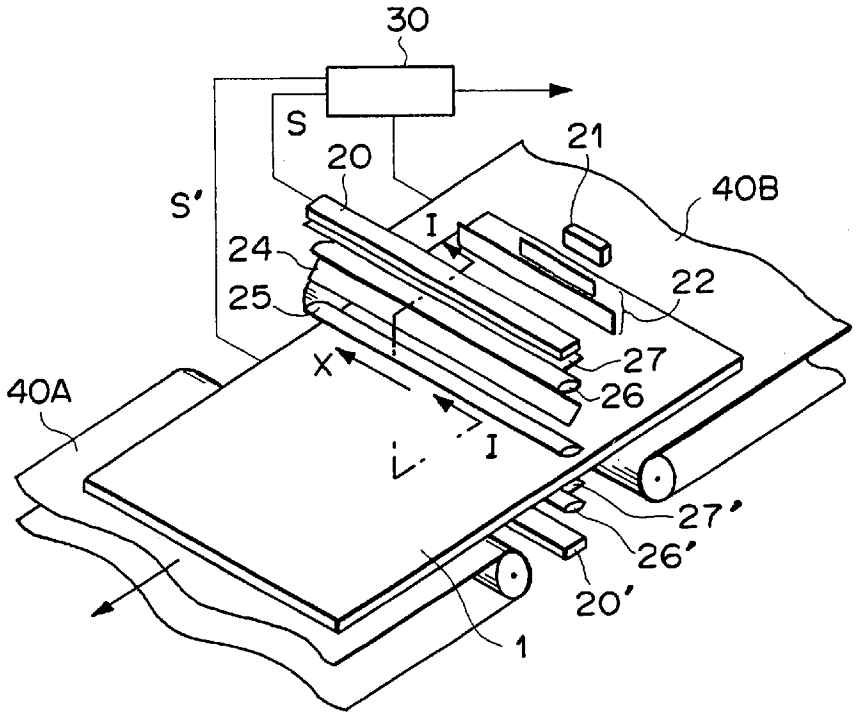
FIG. 6 is a perspective view showing a radiation image information reader constructed according to an embodiment of the present invention.
Figure 7:
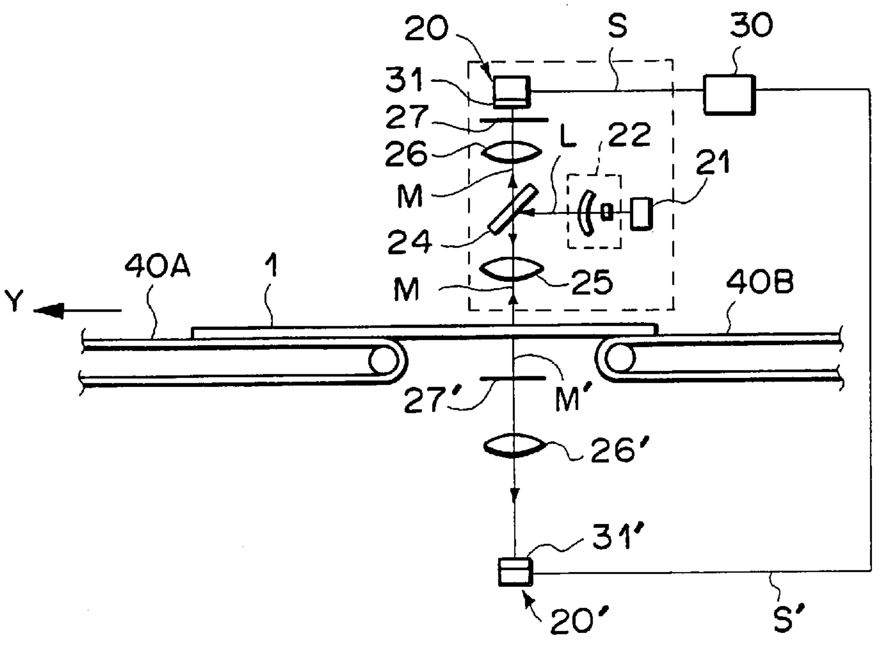
FIG. 7 is a sectional view of the radiation image information reader taken substantially along line I—I in FIG. 4.

As illustrated in FIGS. 6 and 7, a radiation image information reader comprises (1) conveyor belts 40A and 40B for conveying a radiation image converting panel (hereinafter referred to as a panel) 1 recorded with radiation image information in the direction of arrow Y; (2) a broad area semiconductor laser (hereinafter referred to as a BLD) 21 for emitting line laser light L of oscillating wavelength 600 to 700 nm with a linewidth of approximately 100 $\mu$m approximately parallel to the surface of the panel 1; (3) an optical system 22 consisting of a combination of a collimator lens for collimating the line laser light L emitted from the BLD 21 and a toric lens for spreading a beam in only one direction; (4) a dichroic mirror 24 disposed at an angle of 45° to the surface of the panel 1 so that it reflects the laser light L and transmits photostimulated fluorescent light M to be described later; (5) a refractive index profile type lens array (hereinafter referred to as a first CELFOC lens array, in which a large number of refractive index profile type lenses are arrayed) 25 for focusing the line laser light L reflected by the dichroic mirror 24 to a line (with a width of approximately 10 $\mu$m) extending along the direction of arrow X (parallel to the lateral edge of the panel 1) onto the panel 1, and for collimating photostimulated fluorescent light M, emitted from the upper surface of the panel 1 when the line laser light L is focused, which corresponds to the radiation image information stored and recorded on the panel 1; (6) a second CELFOC lens array 26 for focusing the photostimulated fluorescent light M, collimated by the first CELFOC lens array 25, and transmitted through the dichroic mirror 24, on to the light-receiving surfaces of photoelectric converting elements constituting an upper line sensor 20 that is to be described later; (7) an upper excitation, light cut filter 27 for transmitting the photostimulated fluorescent light M while cutting off the laser light L, reflected at the panel surface, and slightly contained in the photostimulated fluorescent light M transmitted through the second CELFOC lens array 26; (8) the upper line sensor 20 with a large number of photoelectric converting elements 31 for receiving and photoelectrically converting the photostimulated fluorescent light M transmitted through the upper excitation light cut filter 27; (9) a lower excitation light cut filter 27' for transmitting photostimulated fluorescent light M' emitted from the lower surface of the panel 1 when the light laser light L is focused on the upper surface of the panel 1, while cutting off the laser light L emitted slightly from the lower surface; (10) a third CELFOC lens array 26' for focusing the photostimulated fluorescent light M', transmitted through the lower excitation light cut filter 27', on to the light-receiving surfaces of photoelectric converting elements constituting a lower line sensor 20' to be described later; (11) the lower line sensor 20' with a large number of photoelectric converting elements 31' for receiving and photoelectrically converting the photostimulated fluorescent light M' transmitted through the third CELFOC lens array 26'; and (12) image information reading means 30 for reading out signals output from the upper and lower converting elements 31 and 31' of the upper and lower line sensors 20 and 20' and then performing a predetermined weighting-adding process on the read signals in correspondence with the pixels on the upper and lower surfaces of the panel 1.

Here, the panel 1 used in the radiation image information reader of this embodiment is formed by stacking a stimulatable fluorescent layer on a supporting layer, and the supporting layer is formed from a material that can transmit photostimulated fluorescent light.

The first CELFOC lens array 25 functions as an image plane, on which the luminescent region of the photostimulated fluorescent light M on the upper surface of the panel 1 is formed at 1:1 magnification, on the dichroic mirror 24. The second CELFOC lens array 26 functions as an image plane, on which the image of the photostimulated fluorescent light M on the dichroic mirror 24 is formed at 1:1 magnification, on the light receiving surfaces of the photoelectric converting elements 31 of the upper line sensor 20. The third CELFOC lens array 26' functions as an image plane, on which the image of the photostimulated fluorescent light M' on the lower surface of the panel 1 is formed at 1:1 magnification, on the light receiving surfaces of the photoelectric converting elements 31' of the lower line sensor 20'.

Figure 8:
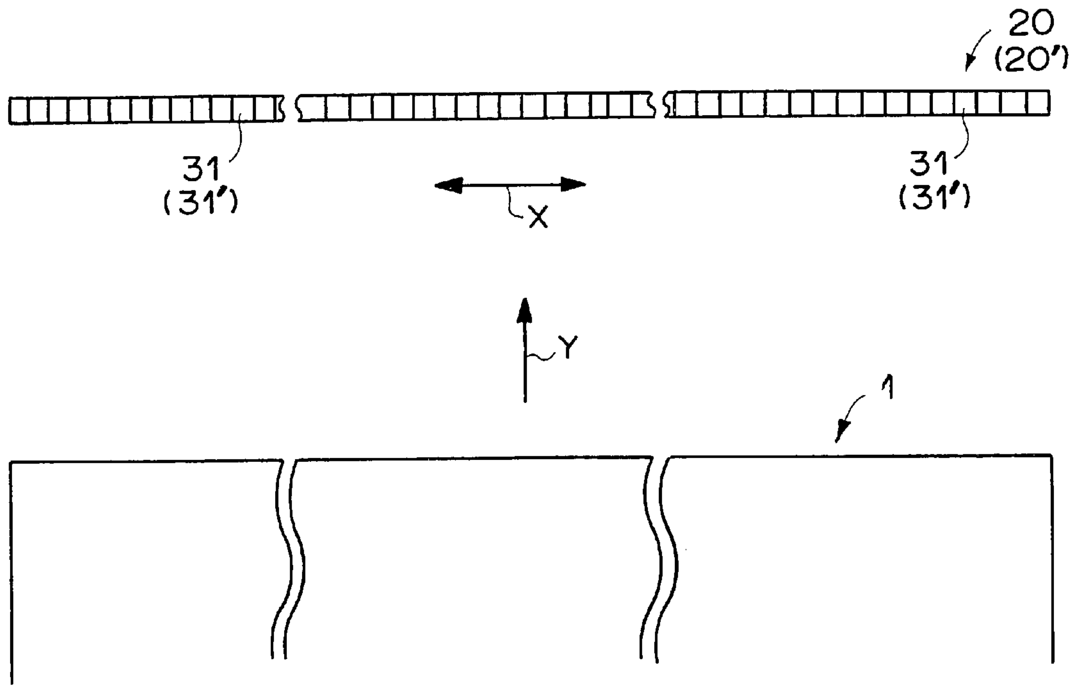
FIG. 8 is a diagram showing the relationship of directions of travel between the line sensor and the panel.

The upper line sensor 20, as shown in FIG. 8, is constructed such that a large number of photoelectric converting elements 31 (e.g., 1000 or more elements) are arrayed along the direction of arrow X. Similarly, the lower line sensor 20' is constructed such that a large number of photoelectric converting elements 31' are arrayed along the direction of arrow X. The photoelectric converting elements 31 or 31' have a light receiving surface with a size of about 100 $\mu$m in length and 100 $\mu$m in breadth. This size corresponds to a region of 100 $\mu$m in length and 100 $\mu$m in breadth on the panel 1 from which the photostimulated fluorescent light M is emitted. Note that the photoelectric converting sensors 31, 31' can employ an amorphous silicon sensor, a CCD imager, a MOS imager, etc. Also, the line sensors 20, 20' are the same, although they are given different reference numerals for convenience of explanation.

Now, the operation of the radiation image information reader of this embodiment will be described.

The conveyor belts 40A, 40B are first moved in the direction of arrow Y, whereby the panel 1 recorded with radiation image information is conveyed in the same direction. The speed of the panel 1 at this time equals the travel speed of the belts 40A, 40B, and the travel speed is input to the image information reading means 30.

On the other hand, line laser light L with a linewidth of approximately 100 $\mu$m is emitted approximately parallel to the surface of the panel 1. This laser light L is made a nearly collimated beam of light by the optical system 22 consisting of the collimator lens and the toric lens, provided on the optical path. The collimated laser light L is reflected by the dichroic mirror 24 and travels in a direction perpendicular to the surface of the panel 1. The laser light L is focused to a line of approximately 100 $\mu$m in width that extends along the direction of arrow X.

The line laser light L incident on the panel 1 excites the stimulatable fluorescent layer of the light focused region of the panel 1. With the excitation, photostimulated fluorescent lights M and M', which have a luminescent intensity corresponding to the radiation image information stored and recorded on the fluorescent layer, are emitted from the upper and lower surfaces of the panel 1, respectively.

The photostimulated fluorescent light M emitted from the upper surface of the panel 1 is made a nearly collimated beam of light by the first CELFOC lens array 25 and transmitted through the dichroic mirror 24. The photostimulated fluorescent light M transmitted through the dichroic mirror 24 is focused on the light receiving surfaces of the photoelectric converting elements 31 of the upper line sensor 20 by the second CELFOC lens array 26. When this occurs, a small amount of the laser light L reflected at the upper surface of the panel 1 is contained in the photostimulated fluorescent light M transmitted through the second CELFOC lens array 26. Because of this, the laser light L reflected at the upper surface of the panel 1 is cut off by the excitation light cut filter 27.

The photostimulated fluorescent light M transmitted through the filter 27 is received by the photoelectric converting elements 31 of the upper line sensor 20 and is converted to electrical image signals S by photoelectric conversion. These signals S are input to the image information reading means 30.

On the other hand, the photostimulated fluorescent light M' emitted from the lower surface of the panel 1 is transmitted through the lower excitation light cut filter 27' and incident on the third CELFOC lens array 26'. Although a small amount of the laser light L transmitted through the panel 1 is also emitted slightly from the lower surface of the panel 1, this laser light L is cut off by the lower excitation light cut filter 27'.

The photostimulated fluorescent light M' transmitted through the lower excitation light cut filter 27' is focused on the light receiving surfaces of the photoelectric converting elements 31' of the lower line sensor 20' by the third CELFOC lens array 26'. The focused fluorescent light M' is converted to electrical image signals S' by the photoelectric converting elements 31'. The image signals S' thus obtained are input to the image information reading means 30.

The image information reading means 30 correlates the input image signals S and S' with the pixels on the panel 1 corresponding to the quantity of movement of the conveyor belts 40A, 40B. Furthermore, the image signals S and S' of the upper and lower surfaces of the panel 1 correlated with the same pixel are subjected to a weighting-adding process at a predetermined ratio of addition.

With the foregoing operation, in the image information reader of this embodiment, the image signals of the upper and lower surfaces of the panel 1 are added for each pixel, and the added signal can disperse noise components respectively produced in random on the upper and lower surfaces of the panel 1, within the effective image region of the panel 1. Therefore, the noise components can be made inconspicuous across the entire panel 1. Furthermore, since the photostimulated fluorescent lights, which are the signal components emitted from the upper and lower surfaces of the panel 1, are focused on each surface, the focusing efficiency is enhanced, and consequently, the S/N ratio is significantly enhanced.

Figure 9:
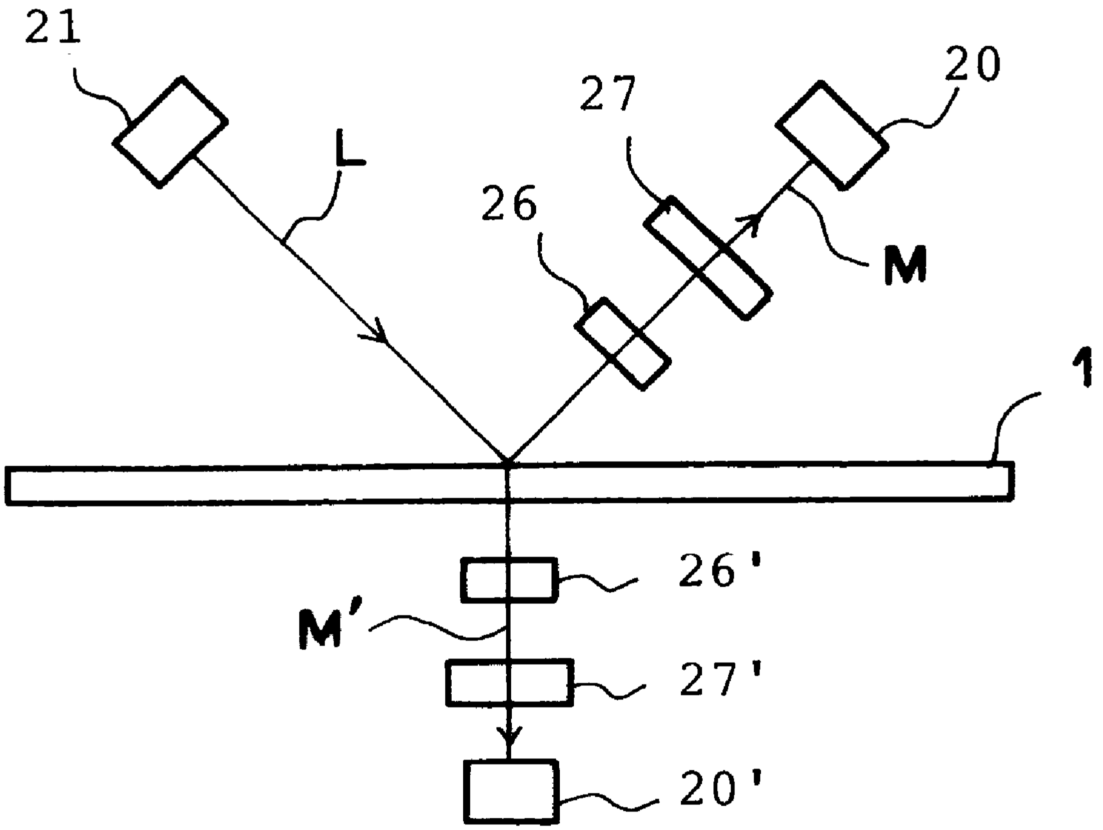
FIG. 9 is a sectional view showing a radiation image information reader constructed according to another embodiment of the present invention.
Figure 10:
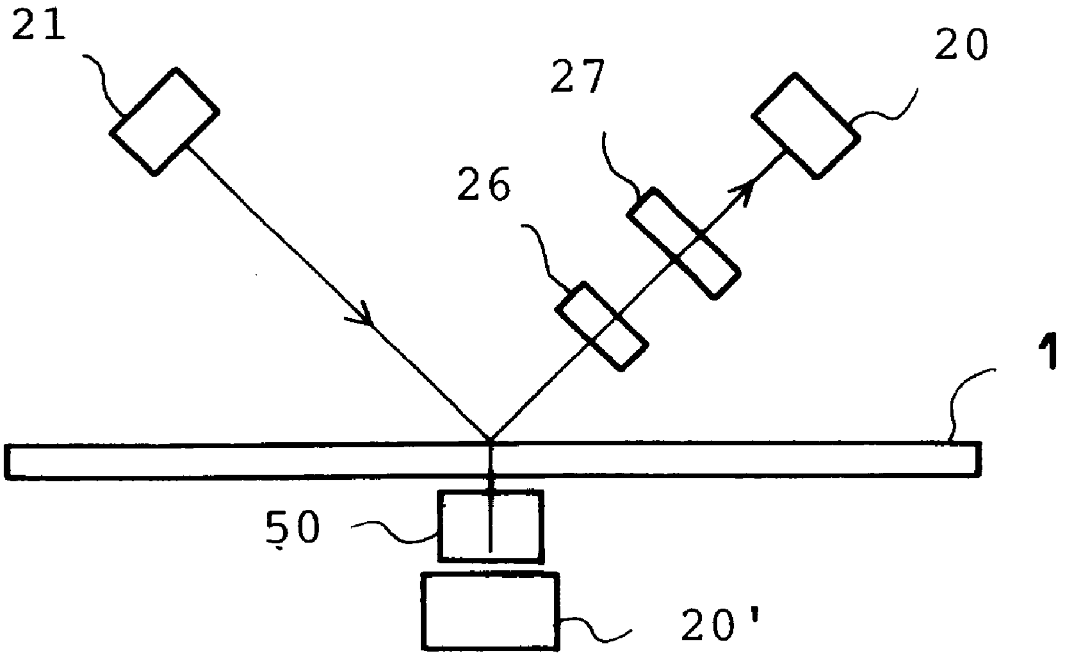
FIG. 10 is a sectional view showing a radiation image information reader constructed according to still another embodiment of the present invention.

While the radiation image information reader of the above-mentioned embodiment is constructed such that the optical path of the laser light L partially overlaps the optical path of the photostimulated fluorescent light M emitted from the surface of the panel 1 in order to make the reader more compact, the present invention is not limited to such a construction. It may be constructed such that the optical path of the laser light L and the optical path of the photostimulated fluorescent light M do not overlap entirely, as shown in FIG. 9. In this case, the upper excitation light cut filter 27 may be provided at any position between the radiation image converting panel 1 and the upper line sensor 20. Likewise, the lower excitation light cut filter 27' may be provided at any position between the radiation image converting panel 1 and the lower line sensor 20'. In addition, in such a construction, an additional line light source may be provided on the lower surface side of the panel 1. When an additional line light source is provided on the lower surface side of the panel 1, the supporting member needs to be formed from a material that transmits excitation light. Furthermore, as shown in FIG. 10, an optical fiber 50 may be provided in close proximity to the lower surface of the radiation image converting panel 1. It is preferable that the small gap between the fiber 50 and the panel 1 be 50 $\mu$m or less. In this case the optical fiber 50 may have the function of cutting off excitation light.

As has been described hereinbefore, in the panel reading method of the present invention, the stimulatable fluorescent layer of the panel is constituted of the optically independent pillar-shaped stimulatable fluorescent substances. Therefore, the panel reading method has high sensitivity and is capable of enhancing the graininess of an image, by reducing scattering of excitation light and enhancing the sharpness of the image.

Also, if the partitions for dividing the optically independent pillar-shaped fluorescent substances formed by the deposition method contain a stimulatable fluorescent substance, there is no possibility of the fill amount of the fluorescent particles of the fluorescent layer per unit volume being reduced, and consequently, a reduction in the sensitivity of the radiation image converting panel can be further suppressed.

In addition, the panel reading method of the present invention can capture a larger amount of photostimulated fluorescent light in the direction of thickness of the fluorescent layer, because it photoelectrically reads out photostimulated florescent light from both surfaces of the radiation image converting panel. Therefore, the reading method is capable of enhancing quality (sharpness) and also enhancing the S/N ratio of the radiation image reproduced by an image signal obtained.

Furthermore, by performing the irradiation of excitation light using a line light source for irradiating excitation light in line form, and by performing reading from both surfaces of the radiation image converting panel using a line sensor having a large number of photoelectric converting elements arrayed in line form, the time required to read photostimulated fluorescent light can be shortened.

In addition, all of the contents of Japanese Patent Application Nos. 11(1999)-255757 and 2000-265397 are incorporated into this specification by reference.

What is claimed is:

1. A method of reading a radiation image converting panel which comprises at least an optically transparent supporting member and a fluorescent layer having pillar-shaped stimulatable fluorescent substances formed on said supporting member by a vapor deposition method, the reading method comprising the steps of:

exciting said stimulatable fluorescent substances by irradiating excitation light to a surface of said radiation image converting panel on which radiation energy has been stored and recorded by irradiation of said radiation;

emitting said radiation energy as photostimulated fluorescent light; and reading out said photostimulated fluorescent light photoelectrically from both surfaces of said radiation image converting panel.

2. The method as set forth in claim 1, wherein the irradiation of said excitation light is performed by a line light source which emits said excitation light in line form, and said reading from both surfaces of said radiation image converting panel is performed by a line sensor having a large number of photoelectric converting elements arrayed in line form.

3. A method of reading a radiation image converting panel which comprises at least an optically transparent supporting member and a fluorescent layer having pillar-shaped stimulatable fluorescent substances formed on said supporting member by deposition method, the reading method comprising the steps of:

exciting said stimulatable fluorescent substances by irradiating excitation light to a surface of said radiation image converting panel on which radiation energy has been stored and recorded by irradiation of said radiation;

emitting said radiation energy as photostimulated fluorescent light; and reading out said photostimulated fluorescent light photoelectrically from both surfaces of said radiation image converting panel wherein a multi-layer film filter for transmitting only photostimulated fluorescent light is provided on the opposite side from the side of said radiation image converting panel to which said excitation light is irradiated.

* * * * *